(12) United States Patent
O'Gwynn et al.

(10) Patent No.: US 12,095,951 B2
(45) Date of Patent: *Sep. 17, 2024

(54) SYSTEMS AND METHODS FOR PROVIDING HEADSET VOICE CONTROL TO EMPLOYEES IN QUICK-SERVICE RESTAURANTS

(71) Applicant: H.M. Electronics, Inc., Carlsbad, CA (US)

(72) Inventors: David O'Gwynn, Oceanside, CA (US); Rick Evan Schwartz, Carlsbad, CA (US)

(73) Assignee: H.M. Electronics, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/352,748

(22) Filed: Jul. 14, 2023

(65) Prior Publication Data

US 2023/0362304 A1 Nov. 9, 2023

Related U.S. Application Data

(63) Continuation of application No. 17/833,545, filed on Jun. 6, 2022, now Pat. No. 11,706,348, which is a (Continued)

(51) Int. Cl.
*H04M 3/42* (2006.01)
*G06Q 50/12* (2012.01)
(Continued)

(52) U.S. Cl.
CPC .............. *H04M 3/56* (2013.01); *G06Q 50/12* (2013.01); *G06Q 50/40* (2024.01); *G10L 15/08* (2013.01);
(Continued)

(58) Field of Classification Search
CPC ..... H04M 3/56; G06Q 50/40; G10L 2015/088
(Continued)

(56) References Cited

U.S. PATENT DOCUMENTS 5,117,501 A 5/1992 Childress
7,082,314 B2 7/2006 Farmer
(Continued)

FOREIGN PATENT DOCUMENTS

CA 3083577 6/2019
EP 1207452 5/2002

*Primary Examiner* — William J Deane, Jr.
(74) *Attorney, Agent, or Firm* — Esplin & Associates, PC

(57) ABSTRACT

Systems and methods for providing headset/ear bud voice control to crew members in a quick-service restaurant are disclosed. Exemplary implementations may: transmit transmission signals from a headset to the base station, receive reception signals by the headset from the base station; capture audio information from a first crew member, generate sound based on the received reception signals, generate the transmission signals to form a headset-specific uplink packet based on the captured audio information; generate semantic information based on the headset-specific uplink packet, wherein the semantic information includes one or more individual words; determine one or more commands that modify operation of the communication system, based on the semantic information, and facilitate execution of the one or more commands to control and/or modify the operation of the communication system.

13 Claims, 5 Drawing Sheets

Related U.S. Application Data continuation of application No. 17/028,776, filed on Sep. 22, 2020, now Pat. No. 11,356,561.

(51) Int. Cl.
*G06Q 50/40* (2024.01)
*G10L 15/08* (2006.01)
*H04L 65/4038* (2022.01)
*H04L 65/60* (2022.01)
*H04M 3/533* (2006.01)
*H04M 3/56* (2006.01)
*H04R 1/08* (2006.01)
*H04R 1/10* (2006.01)

(52) U.S. Cl.
CPC .......... *H04L 65/4038* (2013.01); *H04L 65/60* (2013.01); *H04M 3/533* (2013.01); *H04R 1/08* (2013.01); *H04R 1/10* (2013.01); *G10L 2015/088* (2013.01)

(58) Field of Classification Search
USPC ...... 379/242, 201.01, 88.01; 455/518, 414.1, 455/412
See application file for complete search history.

(56) References Cited

U.S. PATENT DOCUMENTS

| | | | |
|---|---|---|---|
| 7,920,539 B2 | 4/2011 | Stanford | |
| 8,447,324 B2 | 5/2013 | Shuman | |
| 8,553,865 B2 | 10/2013 | Menard | |
| 8,983,383 B1 * | 3/2015 | Haskin | H04M 1/6041 455/556.1 |
| 9,408,022 B1 | 8/2016 | O'Gwynn | |
| 9,641,926 B2 | 5/2017 | Awiszus | |
| 9,641,933 B2 | 5/2017 | Appelbaum | |
| 10,869,179 B1 | 12/2020 | Ma | |
| 10,993,088 B1 | 4/2021 | O'Gwynn | |
| 11,310,634 B2 | 4/2022 | O'Gwynn | |
| 11,452,073 B2 | 9/2022 | O'Gwynn | |
| 11,665,713 B2 | 5/2023 | O'Gwynn | |
| 2003/0100274 A1 | 5/2003 | Brown | |
| 2003/0134666 A1 | 7/2003 | Fletcher | |
| 2003/0162504 A1 | 8/2003 | Sabongi | |
| 2004/0116071 A1 | 6/2004 | Hall | |
| 2006/0045063 A1 | 3/2006 | Stanford | |
| 2006/0093117 A1 | 5/2006 | Agrawal | |
| 2008/0318592 A1 * | 12/2008 | Mandalia | H04W 4/029 455/456.1 |
| 2009/0080396 A1 | 3/2009 | Song | |
| 2009/0291646 A1 | 11/2009 | Ong | |
| 2010/0190518 A1 | 7/2010 | Lindner | |
| 2010/0271983 A1 * | 10/2010 | Bryant | H04B 1/385 370/352 |
| 2012/0140747 A1 | 6/2012 | Taniguchi | |
| 2014/0153485 A1 | 6/2014 | Tsuda | |
| 2016/0127264 A1 | 5/2016 | Williamson | |
| 2016/0189249 A1 | 6/2016 | Meyer | |
| 2016/0366528 A1 * | 12/2016 | Landqvist | H04M 9/00 |
| 2017/0324807 A1 | 11/2017 | Gu | |
| 2018/0317165 A1 | 11/2018 | Krishnamoorthy | |
| 2019/0104377 A1 | 4/2019 | Nilsson | |
| 2020/0106630 A1 | 4/2020 | Bourassa | |
| 2021/0243150 A1 | 8/2021 | Vasamsetti | |
| 2021/0392471 A1 | 12/2021 | OGwynn | |
| 2022/0053453 A1 | 2/2022 | O'Gwynn | |
| 2022/0094795 A1 | 3/2022 | O'Gwynn | |
| 2022/0240057 A1 | 7/2022 | O'Gwynn | |
| 2022/0303392 A1 | 9/2022 | O'Gwynn | |
| 2022/0361145 A1 | 11/2022 | O'Gwynn | |
| 2023/0209574 A1 | 6/2023 | O'Gwynn | |

* cited by examiner

*Fig. 4A*

| Channel Select: | Communication Group I | Communication Group II | Communication Group III |
|---|---|---|---|
| "A" | C1 | C2 | C7 |
| "B" | C3 | C3 | C4 |
| "C" | C4 | C5 | C5 |
| "D" | C6 | C6 | C6 |

*Fig. 4B*

| Channel Select: | Communication Group I | Communication Group II | Communication Group III | Communication Group IV |
|---|---|---|---|---|
| "A" | C1 | C2 | C7 | C9 |
| "B" | C3 | C3 | C4 | C8 |
| "C" | C4 | C5 | C5 | -- |
| "D" | C6 | C6 | C6 | -- |
| "E" | -- | -- | C8 | -- |

SYSTEMS AND METHODS FOR PROVIDING HEADSET VOICE CONTROL TO EMPLOYEES IN QUICK-SERVICE RESTAURANTS

FIELD OF THE DISCLOSURE

The present disclosure relates to systems and methods for providing headset voice control to individuals or groups of people interacting and/or otherwise working together, such as crew members in a quick-service restaurant.

BACKGROUND

Communication systems using a central communication device and an end-user communication device are known. Intercom communication is known. Benefits of hands-free operation are known in certain contexts, such as during food preparation or the operation of vehicles or other machinery.

SUMMARY

One aspect of the present disclosure relates to a communication system configured for providing headset voice control to crew members or people interacting and/or otherwise working together, e.g., as used by a crew of employees, e.g., in a quick-service restaurant. In some implementations, the quick-service restaurant may have one or more drive-through lanes. As used herein, the term "employee" and derivatives thereof generically refer to people interacting and/or otherwise working together, regardless of official and/or technical employment status or corporate hierarchy. The terms employee and crew member may be used interchangeably, and may include people who own any part of a corporation. The drive-throughs may include one or both of a menu board and a speaker post. The communication system may include one or more communication devices, one or more base stations, and/or other components. Individual components may include electronic storage, one or more hardware processors, and/or other components. The communication devices may be personal communication devices (e.g., headsets, ear buds) associated with individual crew members. Individual communication devices may include one or more of a transceiver, a microphone, a speaker, a packet generator, an instruction controller, a wake-word detector, a user interface, and/or other components. The base station may include one or more hardware processors, electronic storage, and/or other components. The base station may be configured to receive transmission signals from communication devices, generate semantic information based on the transmission signals, determine commands based on the semantic information, facilitate execution of the commands to control and/or modify the operation of the communication system, and/or perform other functionality as described in this disclosure. The electronic storage of the communication system may electronically store information. The information may represent associations of individual voice communication channels with one or more communication groups. Individual ones of the one or more communication groups may be specific to one or more (types of) roles (or positions) of employees, e.g., in the quick-service restaurant. Individual associations may be between an individual voice communication channel and a subset of the one or more communication groups. The one or more communication groups may include a first communication group, a second communication group, a third communication group, and so forth. The first communication group may be specific to (a first type of) roles in the quick-service restaurant that are related to the first drive-through lane. The second communication group may be specific to (a second type of) roles in the quick-service restaurant, and in some cases may be related to a second drive-through lane. The third communication group may be specific to (a third type of) roles in the quick-service restaurant that may be related to food production. The communication system may be configured to determine communication channel assignments for the communication devices.

Another aspect of the present disclosure relates to a method for using a communication system to provide headset voice control to crew members or people interacting and/or otherwise working together, e.g., as used by a crew of employees, e.g., in a quick-service restaurant. The communication system may include one or more headsets or ear buds, a base station, and/or other components. As used herein, the direction from the base station to one or more communication devices (e.g., headsets) may be referred to as downlink and/or downstream. As used herein, the direction to the base station from one or more communication devices may be referred to as uplink and/or upstream. Accordingly, information provided through uplink communication may be referred to as uplink information, information provided through downlink communication may be referred to as downlink information. The method may include transmitting, by a transceiver of a first headset or ear bud, transmission signals to the base station, wherein the transmission signals form a headset-specific uplink packet. The method may include receiving reception signals from the base station, wherein the reception signals form one or more downlink packets including packetized downlink information. The method may include capturing, by a microphone of the first headset/ear bud, audio information from the first crew member during usage of the first headset. The method may include generating, by a speaker of the first headset, sound based on the received reception signals, wherein the generated sound is presented to the first crew member during the usage of the first headset. The method may include generating, by a packet generator of the first headset, the transmission signals to form the headset-specific uplink packet, wherein the headset-specific uplink packet includes packetized uplink information based on the captured audio information. The method may include receiving, by the base station, the transmission signals from the first headset, and extracting the headset-specific uplink packet from the transmission signals. The method may include generating, by the base station, semantic information, wherein generation of the semantic information is based on the extracted headset-specific uplink packet, wherein the semantic information includes one or more individual words. The method may include determining, by the base station, one or more commands that modify operation of the communication system, wherein the one or more commands are based on the semantic information. The method may include facilitating, by the base station, execution of the one or more commands to control and/or modify the operation of the communication system.

Another aspect of the present disclosure relates to a communication system configured for providing headset voice control to crew members or people interacting and/or otherwise working together. The communication system may include one or more communication devices, one or more base stations, and/or other components. The communication system may communicate and/or otherwise exchange information with one or more external systems and/or devices, including but not limited to third-party equipment, kitchen equipment, a timing system (e.g., configured to monitor speed of service information), an inventory management system, a labor management system, a mobile order processing system, a delivery service system, a point-of-sale system, and/or other systems as may be used in different professional contexts where people work together, particularly quick-service restaurants. In some implementations, such exchange of information may provide information to the communication system and/or its users. In some implementations, such exchange of information may transfer instructions or commands to the one or more external systems and/or devices. Individual components of the communication system may include electronic storage, one or more hardware processors, and/or other components. The communication devices may be personal communication devices (e.g., headsets or ear buds) associated with individual crew members. Individual communication devices may include one or more of a transceiver, a microphone, a speaker, a packet generator, an instruction controller, a wake-word detector, a user interface, and/or other components. The base station may include one or more hardware processors, electronic storage, and/or other components. The base station may be configured to receive transmission signals from communication devices, generate semantic information based on the transmission signals, determine commands based on the semantic information, and/or facilitate execution of the commands. In some implementations, execution of the commands may control and/or modify the operation of the communication system. In some implementations, execution of the commands may control and/or modify (operation of) the one or more external systems and/or devices, as described in this disclosure.

As used herein, any association (or relation, or reflection, or indication, or correspondency) involving communication systems, information processing units, processors, communication devices, headsets, ear buds, transceivers, communication protocols, sub-systems, base stations, microphones, analog-to-digital converters, digital-to-analog converters, encoders, decoders, channels, communication groups, time periods, time frames, packets, information signals, sounds, wires, formats, standards, connections, semantic information, words, commands, instructions, messages, user interfaces, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof. As used herein, the terms "connect" and "couple" (and derivatives thereof) may be used interchangeably to indicate a link between multiple components that may or may not include intermediary components.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIGS. 4A-4B illustrate exemplary sets of assignments of voice communication channels, in accordance with one or more implementations.

DETAILED DESCRIPTION

Figure 1:
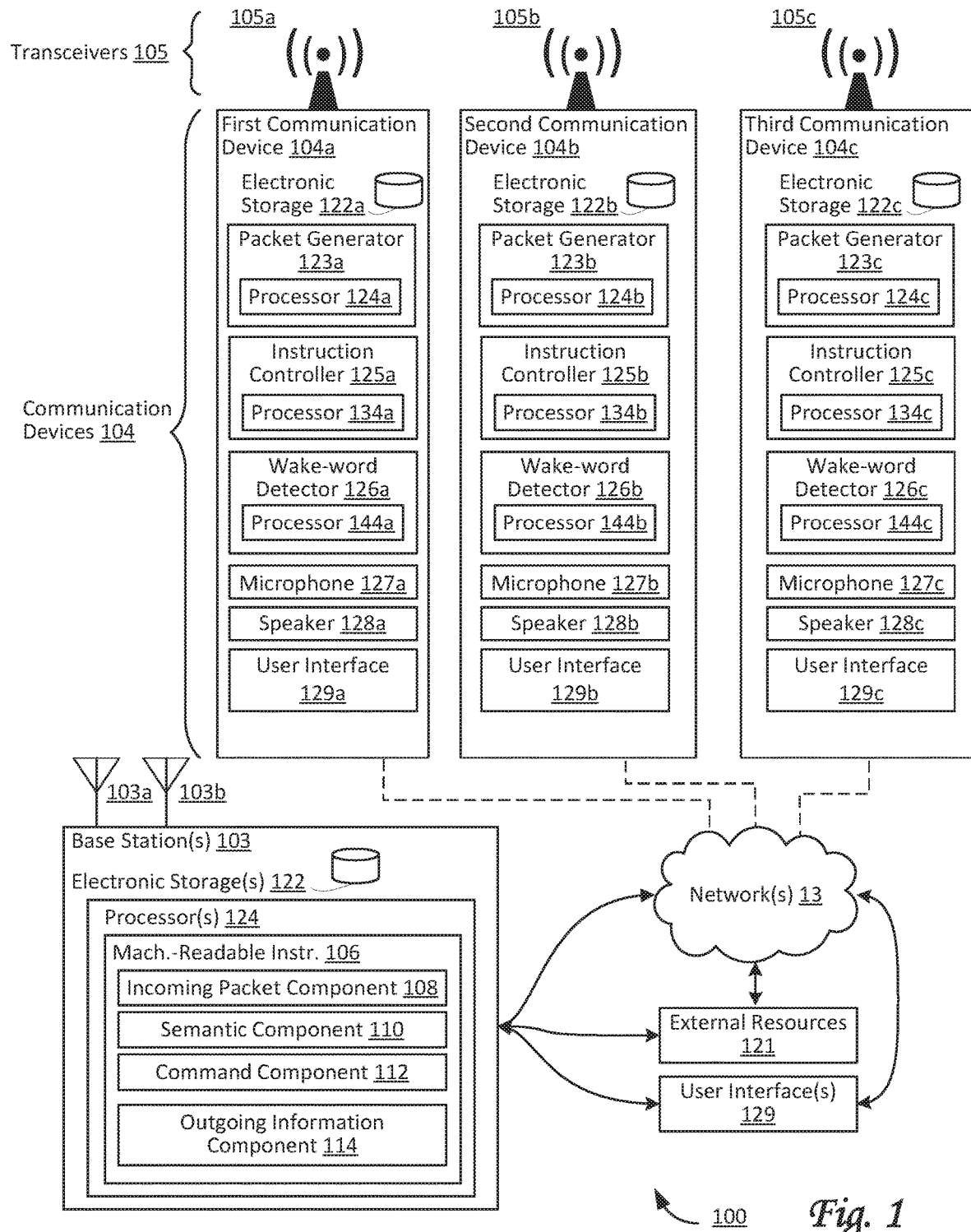
FIG. 1 illustrates a communication system configured for providing headset voice control to crew members in a quick-service restaurant, in accordance with one or more implementations.

FIG. 1 illustrates a system 100 configured for providing headset voice control to crew members or people interacting and/or otherwise working together, e.g., as used by a crew of employees, e.g., in a quick-service restaurant. System 100 may be referred to as an intercom communication system, or as a communication system. In some implementations, system 100 may include one or more base stations 103, one or more external resources 121, one or more user interfaces 129, one or more communication devices 104, and/or other components.

The users of system 100 may include employees, staff members or crew members, managers and/or other stakeholders, and/or other groups of people interacting and/or otherwise working together. The users of system 100 may be divided and/or organized into a set of communication groups. In some implementations, individual communication groups may be specific to one or more (types of) roles of employees in a quick-service restaurant. For example, a given communication group may be specific to a given role or type of role of people interacting and/or otherwise working together. In some implementations, individual communication groups may be specific to one or more locations in a work area and/or other localized area. In some implementations, individual communication groups may be specific to one or more responsibilities in a work area and/or other localized area. For example, the communication groups for a quick-service restaurant may include four communication groups: a first communication group may be specific to roles in the quick-service restaurant that are related to a first drive-through lane, a second communication group may be specific to roles in the quick-service restaurant that are related to a second drive-through lane, a third communication group may be specific to roles in the quick-service restaurant that are related to food production, and a fourth communication group may be specific to roles in the quick-service restaurant that are related to the front counter. Variations may use only one drive-through lane, and/or may combine the groups for food production, front counter, outside order-taking, management, or security. For example, the communication groups for a theater production may include different communication groups for stage crew, audio-visual crew, lighting, front-of-house, director, etc. System 100 may be used in other (professional) contexts where people work together, including but not limited to theme park ride management, medical operating room communications, football coach communications, factory floor communications, and/or other contexts.

Figure 3A:
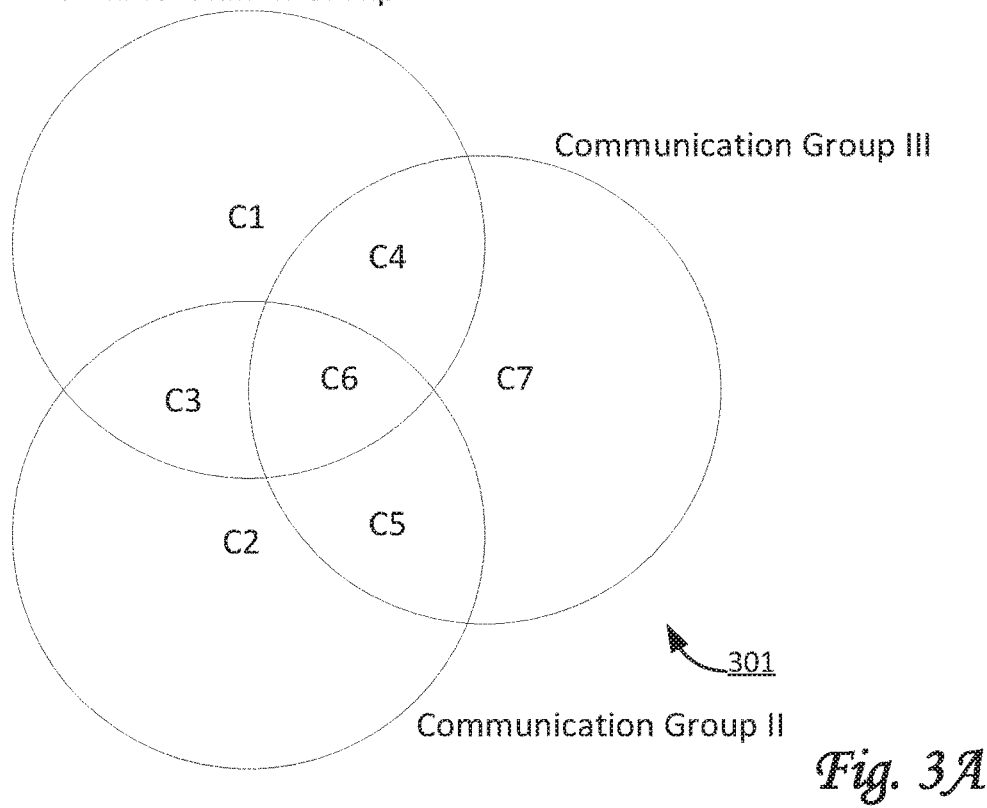
FIGS. 3A-3B illustrate exemplary sets of communication groups as may be used by a system configured for managing voice communication channels used by a group of people, in accordance with one or more implementations.

Voice communication channels managed by system 100 may facilitate communication among and/or between specific (sets of) communication groups. By way of non-limiting example, FIG. 3A illustrates an exemplary set 301 of three communication groups that are specific to different (types of) roles and/or locations in a work area, such as a quick-service restaurant. The first communication group is indicated by the label "Communication Group I". The second communication group is indicated by the label "Communication Group II". The third communication group is indicated by the label "Communication Group III". Communication for different subsets of these three communication groups may use seven different voice communication channels as depicted (though the numbering used for these voice communication channels is exemplary and not intended to be limiting). The voice communication channels in overlap areas in FIG. 3A include mixed communications. Communication (targeted) to just the first communication group may use, at least, a first voice communication channel "C1", in addition to other voice communication channels associated with the first communication group. Communication to just the second communication group may use, at least, a second voice communication channel "C2", in addition to other voice communication channels associated with the second communication group. Communication to both the first and second communication groups may use a third voice communication channel "C3" (in other words, C3 includes communications targeted to the first communication group mixed with communications targeted to the second communication group). Communication to just the third communication group may use, at least, a seventh voice communication channel "C7", in addition to other voice communication channels associated with the third communication group. Communication to both the first and third communication groups may use a fourth voice communication channel "C4" (in other words, C4 includes communications targeted to the first communication group mixed with communications targeted to the third communication group). Communication to both the second and third communication groups may use a fifth voice communication channel "C5" (in other words, C5 includes communications targeted to the second communication group mixed with communications targeted to the third communication group). Communication to the first, second, and third communication groups may use a sixth voice communication channel "C6" (in other words, C6 includes communications targeted to the first communication group mixed with communications targeted to the second communication group and communications targeted to the third communication group).

Figure 3B:
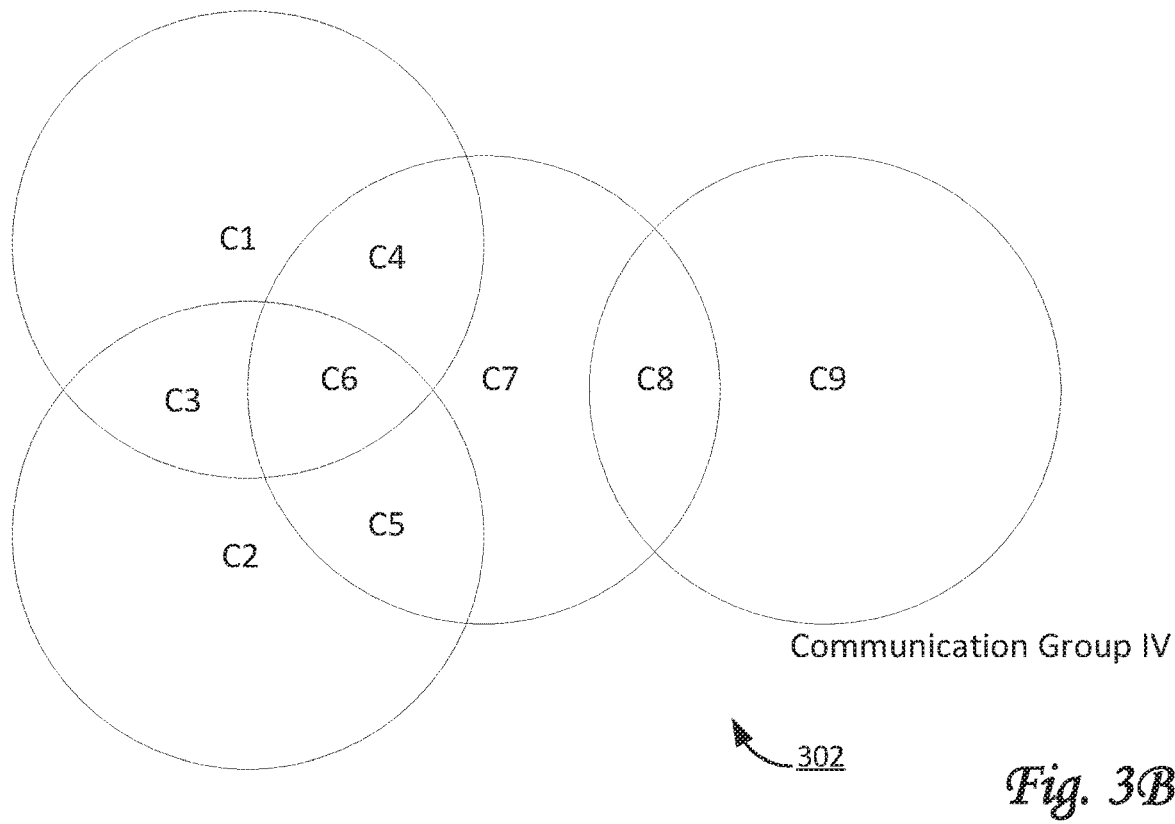

In some implementations, a user in the first communication group could target, direct, and/or transmit a voice message/communication to any of the communication groups, but would only receive voice messages/communication targeted, directed, and/or transmitted to the user personally, or to the first communication group (e.g., the user can select the first, third, fourth, or sixth broadcast channel, depending on which other communication groups are to be added/included). In some implementations, all users in the same communication group may have access to and can listen to the same voice communication channels. In some implementations, there may be no (predetermined) limit to how many different users can listen to the same voice communication channel simultaneously. A user in the second communication group would only receive voice messages/communication targeted, directed, and/or transmitted to the user personally, or to the second communication group (e.g., the user can select the second, third, fifth, or sixth broadcast channel, depending on which other communication groups are to be added/included). A user in the third communication group would only receive voice messages/communication targeted, directed, and/or transmitted to the user personally, or to the third communication group (e.g., the user can select the fourth, fifth, sixth, or seventh broadcast channel, depending on which other communication groups are to be added/included). By way of non-limiting example, FIG. 3B illustrates an exemplary set 302 of four communication groups that are specific to different (types of) roles and/or locations in a work area, such as a quick-service restaurant. Exemplary set 302 is similar to set 301 of FIG. 3A, with an added fourth communication group, indicated by the label "Communication Group IV". Communication to just the fourth communication group may use, at least, a ninth voice communication channel "C9", in addition to other voice communication channels associated with the fourth communication group. Communication to both the third and fourth communication groups may use an eighth voice communication channel "C8" (in other words, C8 includes communications targeted to the third communication group mixed with communications targeted to the fourth communication group). In some implementations, a user in the fourth communication group could target, direct, and/or transmit a voice message/communication to any of the communication groups, but would only receive voice messages/communication targeted, directed, and/or transmitted to the user personally, or to the fourth communication group (e.g., the user can select the eighth or ninth broadcast channel, depending on which other communication groups are to be added/included). In this case, the user in the third communication group could additionally select the eighth voice communication channel.

Referring to FIG. 1, base station 103 may be configured to communicate with one or more communication devices 104 according to a client/server architecture, a point-to-point architecture, and/or other architectures. Communication device(s) 104 (also simply referred to as headsets) may be configured to communicate with other communication devices 104 via system 100. Users may access system 100 via communication devices 104. Communication devices 104 may include a first communication device 104a, a second communication device 104b, a third communication device 104c, and/or other communication devices. First communication device 104a may be associated with a first user, second communication device 104b may be associated with a second user, third communication device 104c may be associated with a third user, and so forth. Communication devices 104 may be portable communication devices, such as headsets, handhelds, smartphones, belt packs, smart glasses, smart bands, and/or other portable communication devices, which may include one or more earphones and/or headphones. In some implementations, communication between communication devices 104 may be performed on a local communications network, such as, by way of non-limiting example, a local area network. Alternatively, and/or simultaneously, in some implementations, the local communications network may include a personal area network. For example, the local communications network may be used in a restaurant, a service location, a theater, an office, a building, a construction site, and/or in other localized areas.

Individual communication devices 104 may include transceivers 105 and/or other components. For example, first communication device 104a may include one or more of a transceiver 105a, electronic storage 122a, a packet generator 123a, an instruction controller 125a, a wake-word detector 126a, a microphone 127a, a speaker 128a, a user interface 129a, and/or other components. For example, second communication device 104b may include one or more of a transceiver 105b, electronic storage 122b, a packet generator 123b, an instruction controller 125b, a wake-word detector 126b, a microphone 127b, a speaker 128b, a user interface 129b, and/or other components. For example, third communication device 104c may include one or more of a transceiver 105c, electronic storage 122c, a packet generator 123c, an instruction controller 125c, a wake-word detector 126c, a microphone 127c, a speaker 128c, a user interface 129c, and/or other components.

In some implementations, one or more components of first communication device 104a may include one or more hardware processors, such as, for example, processor 124a of packet generator 123a, processor 134a of instruction controller 125a, processor 144a of wake-word detector 126a, and/or other processors. In some implementations, one or more components of second communication device 104b may include one or more hardware processors, such as, for example, processor 124b of packet generator 123b, processor 134b of instruction controller 125b, processor 144b of wake-word detector 126b, and/or other processors. In some implementations, one or more components of third communication device 104c may include one or more hardware processors, such as, for example, processor 124c of packet generator 123c, processor 134c of instruction controller 125c, processor 144c of wake-word detector 126c, and/or other processors. The depiction in FIG. 1 of multiple separate hardware processors per communication device is exemplary and not intended to be limiting.

In some implementations, individual communication devices 104 may be configured to operate in individual modes of operation selected from sets of modes of operation. Individual sets of modes of operation may include, by way of non-limiting example, a voice-control mode of operation, a broadcast-participation mode of operation, and/or other modes of operation. Individual communication devices 104 may be configured to transition between different modes of operation, e.g., based on a particular occurrence and/or detection involving individual communication devices 104. In some implementations, an individual communication device 104 may use a stand-by mode of operation that can transition to either the voice-control mode of operation (e.g., upon detection of the wake-word) or the broadcast-participation mode of operation (e.g., upon manual engagement of a button on the headset by the user). In some implementations, a stand-by mode of operation and the broadcast-participation mode of operation may be the same mode of operation that can transition to, e.g., the voice-control mode of operation. Other ways to effectuate transitions between different modes of operation are envisioned within the scope of this disclosure, both manual and hands-free.

Individual ones of the transceivers 105 may be configured to transmit transmission signals to base station 103 and/or receive reception signals from base station 103. In some implementations, the transmission signals may form one or more headset-specific uplink packets. In some implementations, the reception signals may form one or more downlink packets and/or other downlink information. In some implementations, downlink packets may include packetized downlink information that is organized in a set of broadcast channels (which may be selectable by individual users for listening to/monitoring). By way of non-limiting example, (contents of) packetized downlink information may be based on audio and/or video information that was previously (e.g., in a previous time frame) included in one or more other packets, e.g., one or more device-specific packets and/or other uplink information.

In some implementations, individual downlink packets may include packetized downlink information that is organized in a set of broadcast channels. In some implementations, individual downlink packets may have a target and/or destination indication that indicates a network destination in the local communications network for the included packetized downlink information. For example, the network destination may include and/or indicate one or more specific communication devices 104, one or more specific communication groups, and/or other destinations. The set of broadcast channels may include a first broadcast channel, a second broadcast channel, a third broadcast channel, and so forth. Individual broadcast channels may be used for previously received audio information that was targeted to one or more communication groups that are associated with one or more voice communication channels selected from a set of broadcast communication channels. For example, the first broadcast channel may be used for audio information targeted to the first communication group (in accordance with exemplary set of communication groups 301 of FIG. 3A, and the corresponding associations between individual voice communication channels and subsets of the set of communication groups). For example, the second broadcast channel may be used for audio information targeted to the second communication group (in accordance with exemplary set of communication groups 301 of FIG. 3A). For example, the third broadcast channel may be used for audio information targeted, at least, to one of the first and second communication groups (in accordance with exemplary set of communication groups 301 of FIG. 3A). For example, the fourth broadcast channel may be used for audio information targeted, at least, to one of the first and third communication groups (in accordance with exemplary set of communication groups 301 of FIG. 3A). For example, the fifth broadcast channel may be used for audio information targeted, at least, to one of the second and third communication groups (in accordance with exemplary set of communication groups 301 of FIG. 3A). For example, the sixth broadcast channel may be used for audio information targeted, at least, to one of the first through third communication groups (in accordance with exemplary set of communication groups 301 of FIG. 3A). For example, the seventh broadcast channel may be used for audio information targeted to the third communication group (in accordance with exemplary set of communication groups 301 of FIG. 3A).

Individual ones of microphones 127a-127b-127c may be configured to capture audio information from individual users during usage of communication devices 104. In some implementations, a microphone may generate an analog signal, which may be subsequently converted to a digital signal by an analog-to-digital converter (not depicted in FIG. 1) included in an individual communication device 104. In some implementations, a microphone may generate a digital signal, which may be subsequently encoded in a packet by an encoder (not depicted in FIG. 1) included in an individual communication device 104. In some implementations, an individual communication device 104 may include multiple microphones such that a resulting digital signal is based on audio information captured by the multiple microphones.

Individual ones of speakers 128a-128b-128c may be configured to generate sound based on received reception signals. The generated sound may be presented to the individual users during usage of communication devices 104. In some implementations, individual speakers may be embedded, integrated, and/or otherwise included in individual earphones and/or headphones of a headset. In some implementations, received reception signals may be formatted in packets, from which packetized sound information may be extracted and/or decoded (e.g., by a decoder, not depicted in FIG. 1, that is included in an individual communication device 104), and subsequently converted to an analog signal (e.g., by a digital-to-analog converter, not depicted in FIG. 1, that is included in an individual communication device 104). In some implementations, and during some modes of operation, the generated sound may have been captured from one or more other crew members during conversation. In some implementations, and during some modes of operation, the generated sound may have been created and/or otherwise transmitted by base station 103. By way of non-limiting example, base station 103 may request confirmation of a particular voice command, through the generated sound, whereupon the user may respond to confirm or cancel/deny, or signal "yes"/"no" as appropriate. For example, base station 103 may request clarification and/or further details regarding a particular voice command, through the generated sound, whereupon the user may respond as appropriate. For example, a user may provide a command to "leave a message for Joe." Assume the crew includes multiple Joes, base station 103 may request additional information, for example, by asking which Joe the message is for.

Individual ones of packet generators 123a-123b-123c may be configured to generate the transmission signals to form the headset-specific uplink packets. In some implementations, individual headset-specific uplink packets may include packetized uplink information that is based on captured audio information. For example, in the broadcast-participation mode of operation, a user can contribute to the conversation on a particular selected voice communication channel through uplink packets that include audio captured from the user. This audio may be mixed with other communications to the same selected voice communication channel into downlink packets available to user listening to this particular voice communication channel. For example, in the voice-control mode of operation, a user can provide voice commands that include one or more words. These voice commands may be transmitted to base station 103 for processing and/or execution, as described in this disclosure.

Individual ones of instruction controllers 125a-125b-125c may be configured to control operation of individual communication devices 104. In some implementations, individual instruction controllers may receive one or more commands for execution, e.g., from base station 103. In some implementations, individual instruction controllers may be controlled by individual users, e.g., through individual user interfaces that are included in communication devices 104. For example, a user of first communication device 104a may provide user input through user interface 129a, and this user input may control instruction controller 125a. For example, a user of second communication device 104b may provide user input through user interface 129b, and this user input may control instruction controller 125b. For example, a user of third communication device 104c may provide user input through user interface 129c, and this user input may control instruction controller 125c. In some implementations, particular user input may cause individual communication devices 104 to transition to a different mode of operation. For example, pushing a particular button on first communication device 104a may cause a transition to the broadcast-participation mode of operation (such that the user can contribute to the conversation on a particular selected voice communication channel).

In some implementations, an individual instruction controller of an individual communication device 104 may be configured to receive and/or execute commands and instructions from base station 103 (e.g., from outgoing information component 114). For example, the individual instruction controller may receive a command to control and/or modify the operation of the individual communication device 104. For example, instruction controller 125a may receive a command to modify speaker volume (either up or down, or mute, or max volume, for example) of speaker 128a. For example, instruction controller 125a may receive a command to change the selection of the current voice communication channel (e.g., from "A" to "B", as depicted in FIG. 4A). For example, a voice command of "next channel" may be context-dependent and/or headset-specific when implemented (e.g., depending on the current user, the current communication group, the currently selected channel, etc.). For example, instruction controller 125a may receive a command to mute one or more sound sources from the generated sound through speaker 128a. For example, a voice command of "Mute Lane 1" may effectuate muting of a particular sound source and/or a change in the currently selected voice communication channel that has the same effect of excluding the sound intended for "Lane 1" (e.g., change from C6 to C5 for a user in Communication Group II, as depicted in FIGS. 3A-4A). In some implementations, instruction controller 125a may receive a command to provide information (e.g., statistical information regarding call volume, call duration, participation in conversation on broadcast channels, etc.) that is specific to communication device 104a. In some implementations, instruction controller 125a may receive a command to provide information that is specific to the user of communication device 104a.

Individual ones of wake-word detectors 126a-126b-126c may be configured to detect whether the captured audio information on individual communication devices 104 includes an utterance of a predetermine phrase or word (also referred to as a wake-word). In some implementations, such detection may be performed locally, on individual headsets. In some implementations, response to such detection, individual communication devices 104 may transition to a particular mode of operation. For example, responsive to detection of the wake-word, first communication device 104a may transition to the voice-control mode of operation. For example, in the voice-control mode of operation, first communication device 104a and base station 103 may operate together as described herein, where information based on audio captured from the user is transmitted to base station 103 for analysis, and detected voice commands are executed by first communication device 104a and/or base station 103.

In some implementations, first communication device 104a may transition to the voice-control mode of operation in response to a user interacting with user interface 129a. For example, communication device 104a may transition to the voice-control mode of operation when a user presses a button.

Base station 103 may include one or more of electronic storage 122, processor(s) 124, a first antenna 103a, a second antenna 103b, and/or other components. In some implementations, individual antennas of base station 103 may be configured to operate in conjunction with individual transceivers, including but not limited to transceivers 105 of communication devices 104. By virtue of having two separate antennas and/or two separate transceivers (not depicted in FIG. 1), communications by base station 103 may be improved (by way of non-limiting example, in terms of reliability, audio quality, and/or other quality factors) by providing different types of diversity. The different types of diversity may include one or more of antenna diversity, transceiver diversity, spatial diversity (e.g., if multiple antennas are disposed and/or positioned in different locations), frequency diversity, channel diversity, time diversity, and/or other types of diversity.

Communications between base station 103 and one or more communication devices 104 may be based on the exchange of packets of information that are formatted in one or more particular formats. In some implementations, packets may be formatted using a format based on the (IEEE) 802.11 family of standards. In some implementations, packets may have a proprietary format. In some implementations, downlink packets may be broadcast packets that are transmitted to multiple communication devices 104 at once. In some implementations, uplink packets may be device-specific packets that are transmitted by a particular communication device 104. Packetized communication may have overhead, e.g., due to the use of header information, which may reduce the efficiency of the communication. Downlink packets may be more efficient than uplink packets, since information for multiple communication devices 104 may be transmitted at once, whereas uplink packets may only contain information from a single communication device 104.

Base station 103 may use different communication protocols, communication formats, and/or communication links to communicate with different ones (and/or different types) of communication devices 104 and/or other components of system 100. For example, a primary (wireless) communication link may be used to communicate with first communication device 104a. In some implementations, base station 103 may use second antenna 103b (and a corresponding transceiver, not depicted) to transmit and/or receive information over the primary communication link, using a second frequency range. In some implementations, communication in system 100 may be supported without the need or use of cellular networks or public networks. In some implementations, base station 103 may include and/or use only one antenna for communication with communication devices 104.

Processor(s) 122 may be configured by machine-readable instructions 106. Machine-readable instructions 106 may include one or more instruction components. The instruction components may include computer program components. The instruction components may include one or more of an incoming packet component 108, a semantic component 110, a command component 112, an outgoing information component 114, and/or other instruction components. In some implementations, one or more of the instruction components may be part of other processor(s) 124.

Incoming packet component 108 may be configured to receive information, including but not limited to packets. In some implementations, incoming packet component 108 may receive transmission signals from individual communication devices 104. In some implementations, incoming packet component 108 may receive headset-specific uplink packets from communication devices 104. In some implementations, incoming packet component 108 may be configured to extract information, including but not limited to headset-specific uplink packets, from received information, e.g., from received transmission signals.

Semantic component 110 may be configured to generate semantic information. As used herein, the term "semantic" refers to the meaning of language, in this case voice commands and/or other communication from a user (such as a crew member). In some implementations, the generation of the semantic information may be accomplished through speech recognition techniques, computational linguistics, speech-to-text processing, and/or other techniques capable of identifying words and/or phrases as uttered by people (particularly, crew members). In some implementations, the used techniques may be based on one or more of Hidden Markov Models (HMM), Dynamic Time Warping (DTW), neural networks, deep learning, and/or other techniques. For example, a crew member might say "Switch lanes," into a microphone of his or her headset (i.e., individual communication device 104). Semantic component 110 may identify specific words through performing speech recognition on the corresponding transmission signals received from the headset. In some implementations, semantic component 110 may be configured to identify specific words and/or phrases that indicate the crew member wishes to communicate commands to base station 103 or to other crew members. In some implementations, the generated semantic information includes one or more individual words, such as, by way of non-limiting example, "volume", "up", "down", "mute", "next", "channel", "lane", "send", "message", "answer", "phone", etc. For example, the crew member might say "Mute front counter" or "Voicemail". Responsive to the identification of specific words and/or phrases, system 100 may initiate appropriate actions.

In some implementations, semantic component 110 may determine that additional information is needed from the user, e.g., to clarify or confirm a particular command. In some implementations, semantic component 110 may be configured to determine an error condition, and cause the user to be notified accordingly. For example, responsive to a particular user providing a command that the particular user is not authorized to give, system 100 may detect and/or identify an error condition. For example, "I'm sorry, only the Manager is allowed to leave messages for other crew members."

Command component 112 may be configured to determine commands that control and/or modify operation of system 100. In some implementations, command component 112 may be configured to determine commands that control and/or modify one or more external systems and/or devices. Determination of commands may be based on the semantic information, e.g., as generated by semantic component 110. In some implementations, command component 112 may be configured to execute determined commands. In some implementations, a command may be a local command if it controls and/or modifies only the operation of the particular communication device 104 that was used in issuing the corresponding voice command. In some implementations, a command may be a global command if it controls and/or modifies the operation of either base station 103 and/or any other individual communication devices 104 other than the particular communication device 104 that was used in issuing the corresponding voice command.

For example, in some implementations, a command determined by command component 112 may control the process of delivering and/or leaving a voice message for one or more particular users, or for a channel. For example, in some implementations, a command determined by command component 112 may control the process of retrieving, playing back, forwarding, and/or deleting a voice message that has been left for the user. For example, in some implementations, a command determined by command component 112 may control the process of initiating a real-time telephone conversation with a particular person, or responding to a telephone call, or forwarding a telephone call to another user using another communication device 104.

In some implementations, a command determined by command component 112 may query system 100 for status information. For example, a particular command may query the system 100 for the charge status of a battery for one of communication devices 104. For example, a particular command may query the system 100 regarding the status of one or more components of system 100.

In some implementations, a command determined by command component 112 may query a particular external system or device. For example, a particular command may query a timer system for information regarding average wait times in the quick-service restaurant. For example, a particular command may query the point-of-sale system regarding a quantity of a particular item sold in some period of time. For example, a particular command may cause a particular fryer to lift its basket out of the oil (for example, in response to the particular fryer causing a notification to be communicated to one or more crew members, or to base station 103). In some implementations, command component 112 may be configured to interact with one or more external systems and/or devices. For example, command component 112 may be configured to interpret messages and/or other information from a particular external system or a particular external device. For example, command component 112 may be configured to generate commands and/or queries for the particular external system or the particular external device. In some implementations, such interaction with external systems and/or devices may be provided by a separate component of system 100.

Outgoing information component 114 may be configured to facilitate execution of determined commands (e.g., as determined by command component 112, or in response to a user). In some implementations, outgoing information component 114 may be configured to transmit information (including, e.g., acknowledgements, commands, instructions, and/or other information) to one or more communication devices 104. In some implementations, such transmitted information may be packetized into (downlink) packets of information. In some implementations, outgoing information component 114 may be configured to transmit queries, commands, and/or other information to one or more external systems and/or devices. For example, the transmitted information may have been determined by command component 112. For example, the transmitted information may acknowledge the receipt and/or execution of a previously-given command. For example, the transmitted information may notify the user of some error that has occurred (e.g., an error condition has occurred).

By way of non-limiting example, FIG. 4A illustrates three sets of assignments for employees in each of the first, second, and third communication group as shown in FIG. 3A. The first through fourth communication channels (as may be selected by a user) have been arbitrarily labeled "A", "B", "C", and "D". The first column in FIG. 4A depicts the same assignments as described here for a user in the first communication group (here, the channel labels are not considered a column). By way of non-limiting example, FIG. 3A also depicts a set of four communication channel assignments for a user in the second communication group (Communication Group II), where the first though fourth communication channels as may be selected are labeled C2, C3, C5, and C6, respectively, matching the second column in FIG. 4A. By way of non-limiting example, FIG. 3A also depicts a set of four communication channel assignments for a user in the third communication group (Communication Group III), where the first though fourth communication channels as may be selected are labeled C7, C4, C5, and C6, respectively, matching the third column in FIG. 4A. In some implementations, system 100 may be configured to support dynamic communication channel assignments based on a given user modifying his or her primary role and/or communication group. For example, the given user may be allowed to switch between the first and second communication groups, listening to C4 before the switch, and listening to C5 after the switch.

By way of non-limiting example, FIG. 3B illustrates an exemplary set 302 of four communication groups that are specific to different (types of) roles and/or locations in a work area, such as a quick-service restaurant. Exemplary set 302 is similar to set 301 of FIG. 3A, with an added fourth communication group, indicated by the label "Communication Group IV". For example, for a given employee, assignment component 118 may determine a set of up to five communication channel assignments (e.g., assignments for a first, second, third, fourth, and fifth communication channel, labeled "A" to "E", to subsets of a set of a first, second, third, and fourth communication groups). The assignments for the first and second communication groups may be similar to the depiction in FIG. 4A. Additionally, for an employee in the third communication group, a fifth communication channel labeled C8 may be assigned to the set of third and fourth communication groups, as depicted in the third column of FIG. 4B. For an employee in the fourth communication group, two communication channels labeled C9 and C8 may be assigned as shown in FIG. 3B, and depicted in the fourth column of FIG. 4B.

External resources 121 may include sources of information outside of system 100, external entities participating with system 100, external systems and/or devices, and/or other resources. By way of non-limiting example, the one or more external systems and/or devices may include one or more of third-party equipment, kitchen equipment, a timing system (e.g., configured to monitor speed of service information), an inventory management system, a labor management system, a mobile order processing system, a delivery service system, a point-of-sale system, and/or other systems as may be used in different professional contexts where people work together, particularly quick-service restaurants. In some implementations, some or all of the functionality attributed herein to external resources 121 may be provided by resources included in system 100.

User interface(s) 129 (which may include one or more of user interface 129a, user interface 129b, and user interface 129c) may be configured to facilitate interaction between users and system 100 and/or between users and communication devices 104. For example, user interface(s) 129 may provide one or more interfaces through which users may provide information to and/or receive information from system 100. In some implementations, user interface(s) 129 may include one or more of a display screen, touchscreen, monitor, a smart band, a keyboard, buttons, switches, knobs, levers, mouse, speakers, headphones, microphones, sensors to capture voice commands, sensors to capture eye movement, head movement, and/or body movement, sensors to capture hand and/or finger gestures, and/or other user interface devices configured to receive and/or convey user input. In some implementations, one or more user interfaces may be included in one or more communication devices 104.

Electronic storage(s) 122 (which may include one or more of electronic storage 122a, electronic storage 122b, and electronic storage 122c) may comprise non-transitory storage media that electronically stores information. The electronic storage media of electronic storage(s) 122 may include one or both of system storage that is provided integrally (i.e., substantially non-removable) with base station 103 (or individual communication devices 104) and/or removable storage that is removably connectable to base station 103 (or individual communication devices 104) via, for example, a port (e.g., a USB port, a firewire port, etc.) or a drive (e.g., a disk drive, etc.). Electronic storage(s) 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage(s) 122 may include one or more virtual storage resources (e.g., cloud storage, a virtual private network, and/or other virtual storage resources). Electronic storage(s) 122 may store software algorithms, information determined by processor(s) 124, information received from base station 103, information received from communication device(s) 104, and/or other information that enables system 100 to function as described herein.

In some implementations, information stored in electronic storage(s) 122 may include information that represents associations of individual voice communication channels with one or more communication groups. The individual ones of the one or more communication groups may be specific to one or more roles of people and/or employees, e.g. employees in a quick-service restaurant. The individual ones of the one or more communication groups may be specific to one or more types of roles of interacting people and/or employees, e.g. employees in a quick-service restaurant. In some implementations, the associations may include a first association between a first voice communication channel and a first communication group. The first communication group may be specific to (a first type of) roles in the quick-service restaurant that are related to a first drive-through lane. In some implementations, the associations may include a second association between a second voice communication channel and a second communication group. The second communication group may be specific to (a second type of) roles in the quick-service restaurant that are related to a second drive-through lane. In some implementations, the associations may include a third association between a third voice communication channel and the first and second communication groups. In some implementations, the associations may include a fourth association between a fourth voice communication channel and the first communication group and a third communication group. The third communication group may be specific to (a third type of) roles in the quick-service restaurant that are related to food production. In some implementations, the associations may include a fifth association between a fifth voice communication channel and the second and third communication groups. In some implementations, the associations may include a sixth association between a sixth voice communication channel and the first, second, and third communication groups. In some implementations, the associations may include a seventh association between a seventh voice communication channel and the third communication group. In some implementations, the associations may include an eighth association between an eighth voice communication channel and the third communication group and a fourth communication group. The fourth communication group may be specific to (a fourth type of) roles in the quick-service restaurant that are related to the front counter. In some implementations, the associations may include a ninth association between a ninth voice communication channel and the fourth communication group. For example, these nine voice communication channels may correspond to exemplary set of communication groups 302 of FIG. 3B. Different sets of communication groups (overlapping in different ways) may use voice communication channels differently as needed, using a different set of associations.

Referring to FIG. 1, processor(s) 124 may be configured to provide information processing capabilities in system 100. As such, processor(s) 124 may include one or more of a digital processor, an analog processor, a digital circuit designed to process information, an analog circuit designed to process information, a state machine, and/or other mechanisms for electronically processing information. Although processor(s) 124 are shown in FIG. 1 as various entities, this is for illustrative purposes only. In some implementations, processor(s) 124 may include a plurality of processing units. One or more of these processing units may be physically located within the same device, or processor(s) 124 may represent processing functionality of a plurality of devices operating in coordination. Processor(s) 124 may be configured to execute components 108, 110, 112, and/or 114, and/or other components. Processor(s) 124 may be configured to execute components 108, 110, 112, and/or 114, and/or other components by software; hardware; firmware; some combination of software, hardware, and/or firmware; and/or other mechanisms for configuring processing capabilities on processor(s) 124. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, and/or 114 are illustrated in FIG. 1 as being implemented within a single component, in implementations in which processor(s) 124 includes multiple processing units, one or more of components 108, 110, 112, and/or 114 may be implemented remotely from the other components. The description of the functionality provided by the different components 108, 110, 112, and/or 114 described herein is for illustrative purposes, and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, and/or 114. As another example, processor(s) 124 may be configured to execute one or more additional components that may perform some or all of the functionality attributed below to one of components 108, 110, 112, and/or 114.

Figure 5:
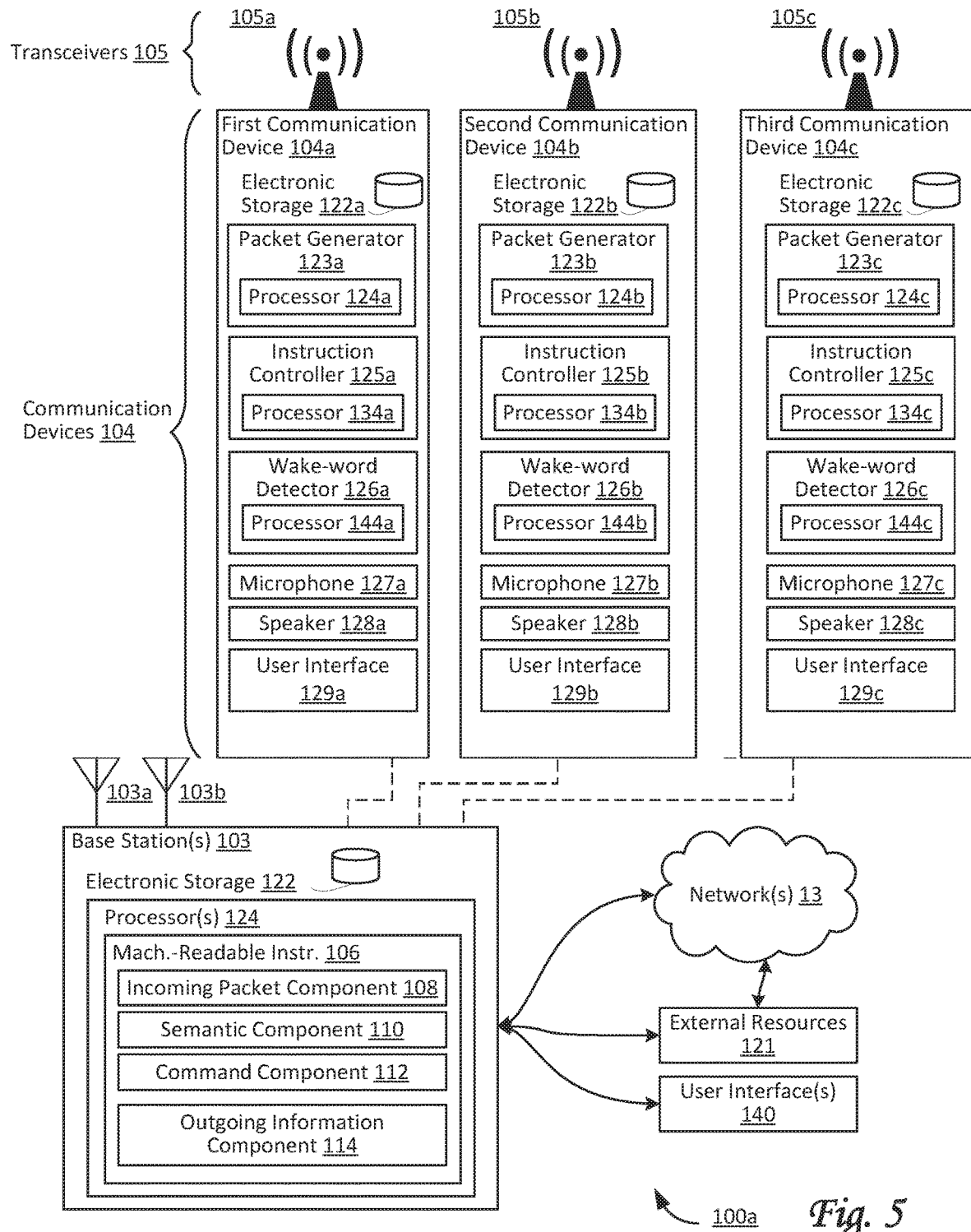
FIG. 5 illustrates an implementation of a communication system configured for providing headset voice control to crew members in a quick-service restaurant.

In some implementations, base station 103, communication device(s) 104, and/or external resources 121 may be operatively linked via one or more electronic communication links. For example, such electronic communication links may be established, at least in part, via one or more networks 13 and/or other networks. It will be appreciated that this is not intended to be limiting, and that the scope of this disclosure includes implementations (e.g., as shown in FIG. 5) in which most of the described components may be operatively linked via some other communication media. By way of non-limiting example, FIG. 5 illustrates a system 100*a* configured for providing headset voice control to crew members or people interacting and/or otherwise working together. System 100*a* may be similar to system 100 depicted in FIG. 1, without base station 103 or communication devices 104 using one or more networks 13. As depicted, one or more of the external resources may use network(s) 13. In other words, in FIG. 5, communication devices 104 may communicate directly and wirelessly with base station 103.

Figure 2:
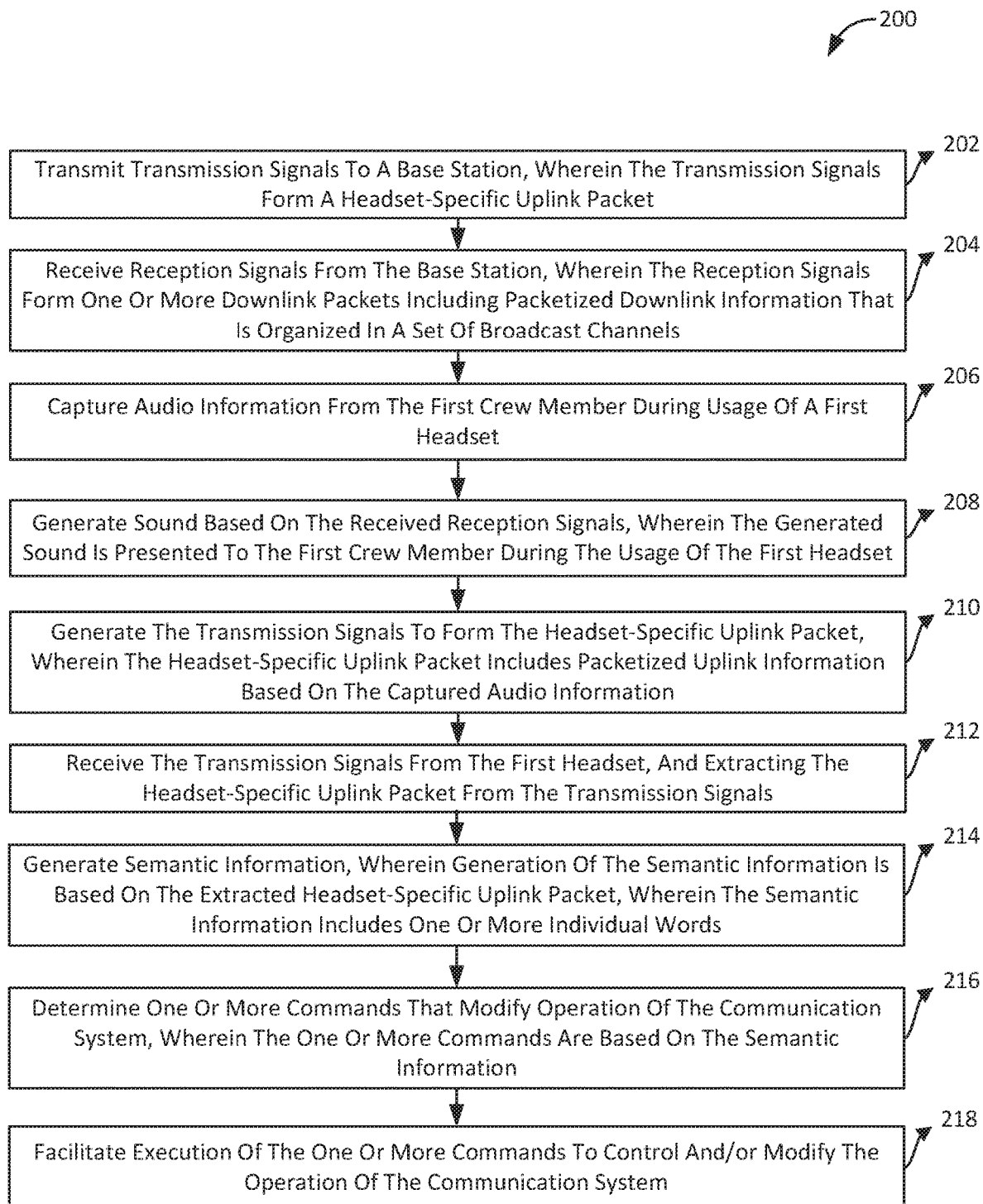
FIG. 2 illustrates a method for using a communication system to provide headset voice control to crew members in a quick-service restaurant, in accordance with one or more implementations.

FIG. 2 illustrates a method 200 for using a communication system to provide headset voice control to crew members in a quick-service restaurant, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202, transmission signals are transmitted, by a transceiver of a first headset, to the base station. The transmission signals form a headset-specific uplink packet. In some embodiments, operation 202 is performed by a transceiver the same as or similar to transceiver 105*a* (shown in FIG. 1 and described herein).

At an operation 204, reception signals are received from the base station. The reception signals form one or more downlink packets including packetized downlink information that is organized in a set of broadcast channels. In some embodiments, operation 204 is performed by a transceiver the same as or similar to transceiver 105*a* (shown in FIG. 1 and described herein).

At an operation 206, by a microphone of the first headset, audio information is captured from the first crew member during usage of the first headset. In some embodiments, operation 206 is performed by a microphone the same as or similar to microphone 127*a* (shown in FIG. 1 and described herein).

At an operation 208, by a speaker of the first headset, sound is generated based on the received reception signals. The generated sound is presented to the first crew member during the usage of the first headset. In some embodiments, operation 208 is performed by a speaker the same as or similar to speaker 128*a* (shown in FIG. 1 and described herein).

At an operation 210, by a packet generator of the first headset, the transmission signals are generated to form the headset-specific uplink packet. The headset-specific uplink packet includes packetized uplink information based on the captured audio information. In some embodiments, operation 210 is performed by a packet generator the same as or similar to packet generator 123*a* (shown in FIG. 1 and described herein).

At an operation 212, by the base station, the transmission signals are received from the first headset, and the headset-specific uplink packet is extracted from the transmission signals. In some embodiments, operation 212 is performed by an incoming packet component the same as or similar to incoming packet component 108 (shown in FIG. 1 and described herein).

At an operation 214, by the base station, semantic information is generated. Generation of the semantic information is based on the extracted headset-specific uplink packet. The semantic information includes one or more individual words. In some embodiments, operation 214 is performed by a semantic component the same as or similar to semantic component 110 (shown in FIG. 1 and described herein).

At an operation 216, by the base station, one or more commands are determined that modify operation of the communication system. The one or more commands are based on the semantic information. In some embodiments, operation 216 is performed by a command component the same as or similar to command component 112 (shown in FIG. 1 and described herein).

At an operation 218, by the base station, execution of the one or more commands to control and/or modify the operation of the communication system is facilitated. In some embodiments, operation 218 is performed by an outgoing information component the same as or similar to outgoing information component 114 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A communication system configured for a group of people, wherein individual ones of the group of people are associated with individual headsets, the system comprising:
  a first headset associated with a first person, wherein the first headset is configured to facilitate communication involving the first person, wherein the first headset includes:
    a transceiver configured to transmit transmission signals to a base station and to receive reception signals from the base station, wherein the transmission signals are used to generate a headset-specific uplink packet;
    a microphone configured to capture audio information from the first person during usage of the first headset;

a speaker configured to generate sound based on the received reception signals, wherein the generated sound is presented to the first person during the usage of the first headset; and a packet generator including one or more hardware processors, wherein the one or more hardware processors of the packet generator are configured by machine-readable instructions to generate the headset-specific uplink packet based on the transmission signals, wherein the headset-specific uplink packet includes packetized uplink information based on the captured audio information; and the base station including one or more hardware processors, wherein the one or more hardware processors of the base station are configured by machine-readable instructions to:

receive the transmission signals from the first headset, and extract the headset-specific uplink packet from the transmission signals;

determine one or more commands for an external system and/or device that is external to the communication system, wherein the one or more commands are based on the extracted headset-specific uplink packet; and facilitate transfer of the one or more commands to the external system and/or device.

2. The system of claim 1, wherein the external system and/or device includes third-party equipment.

3. The system of claim 1, wherein the external system and/or device includes kitchen equipment.

4. The system of claim 1, wherein the external system and/or device pertains to timing functionality.

5. The system of claim 1, wherein the external system and/or device pertains to inventory management.

6. The system of claim 1, wherein the external system and/or device pertains to labor management.

7. The system of claim 1, wherein the external system and/or device pertains to order processing.

8. The system of claim 1, wherein the external system and/or device pertains to delivery services.

9. The system of claim 1, wherein the external system and/or device pertains to point-of-sale services.

10. The system of claim 1, wherein the one or more commands include one or more queries for the external system and/or device.

11. The system of claim 1, wherein the one or more commands pertain to operational status of the external system and/or device.

12. The system of claim 1, wherein the one or more hardware processors of the base station further are configured to generate semantic information based on the extracted headset-specific uplink packet, wherein the semantic information includes one or more individual words, wherein determination of the one or more commands is further based on the semantic information.

13. A method for using a communication system for a group of people, wherein the communication system includes a first headset and a base station, wherein the first headset is associated with a first person, the method comprising:

transmitting, by a transceiver of a first headset, transmission signals to the base station, wherein the transmission signals are used to generate a headset-specific uplink packet;

receiving reception signals from the base station;

capturing, by a microphone of the first headset, audio information from the first person during usage of the first headset;

generating, by a speaker of the first headset, sound based on the received reception signals, wherein the generated sound is presented to the first person during the usage of the first headset;

generating, by a packet generator of the first headset, the headset-specific uplink packet based on the transmission signals, wherein the headset-specific uplink packet includes packetized uplink information based on the captured audio information;

receiving, by the base station, the transmission signals from the first headset, and extracting the headset-specific uplink packet from the transmission signals;

determining, by the base station, one or more commands for an external system and/or device that is external to the communication system, wherein the one or more commands are based on the extracted headset-specific uplink packet; and facilitating, by the base station, transfer of the one or more commands to the external system and/or device for execution.

* * * * *